Patented Apr. 22, 1930

1,755,656

UNITED STATES PATENT OFFICE

WILHELM LENZ, OF BIEBRICH-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PROCESS OF PREPARING DIHYDROXYACETONE

No Drawing. Application filed April 20, 1927, Serial No. 185,360, and in Germany April 26, 1926.

The hitherto known biological processes for transforming glycerine into dihydroxyacetone have the disadvantages that the transformation can only be effected with a quite definite species of bacteria, that the nutritive substratum required for the cultivation of the bacteria must be prepared from relatively expensive products as for instance from yeast or beet-chips, a further disadvantage being that when working up the dihydroxyacetone some difficulties arise from the nutrient liquid frothing very strongly, and that during the conversion of the glycerine detrimental by-products, as for instance dimethylketol, are formed instead of the dihydroxyacetone. Apart from the foregoing considerations the result of the said methods of biologically producing dihydroxyacetone is unsatisfactory from a technical point of view, as the yield amounts on an average to only 33 per cent. of the glycerine used. For all these reasons the hitherto known biological processes do not enter into consideration for industrially producing dihydroxyacetone on a large scale.

I have now found that one is less restricted in the selection of the several kinds of bacteria when using instead of the hitherto employed nutrient solutions a solution which contains a decoction of vegetable materials as for instance straw, wood, hay, bran, ricebran, waste products left in making malt (spent malt, brewers' grains, draff) or the like. On such nutrient media, not only the already known species of bacteria i. e. bacterium xylinum and acetobakter suboxydans are capable of transforming glycerine into dihydroxyacetone, but also a great number of root-bacilli such as can always be easily and conveniently prepared from hay and similar vegetable materials which have undergone fermentation. By using such nutrient media the employment of which for this purpose was hitherto unknown, the few rare kinds of bacteria need not be used, but rather all strongly acidifying bacteria can be employed.

Furthermore, when using the new nutrient medium and the said species of bacteria it is possible to transform the glycerine with a much higher percentage yield than by means of the nutrient media hitherto in use. As a rule, about 100 per cent. of the glycerine are converted into a substance having the property of reducing Fehling's solution in the cold. This complete conversion of the glycerine on the nutrient media above described is accomplished for instance in the course of 4-5 days, whereas the yield of an equal amount of glycerine treated according to the hitherto known methods increases only in the course of 21 days to a maximum of 33 per cent. The further chemical treatment of the dihydroxyacetone thus prepared in a biological way is in no manner mechanically impeded by frothing substances, nor is it to be feared that there will be formed instead of the dihydroxyacetone any volatile substances having the property of reducing Fehling's solution in the cold.

Instead of the above mentioned decoctions of cheap vegetables there may also be used simple solutions of the salts contained in the decoction, after having added thereto simple substances containing carbon and nitrogen, such as for instance lactate of ammonia, glycocoll, asparagine or the like.

The following examples serve to illustrate my invention, but they are not intended to limit it thereto:

(1) One part of wood chips is boiled with 10 parts of water and to the liquid thus obtained is added an amount of, for instance 2 per cent., glycerine. The clear, cooled liquid is then poured into dishes having a large surface, inoculated with one of the active species of bacteria and maintained at a temperature of about 28° C. The continual quantitative test of the degree in which copper sulfate is reduced in the cold, indicates the time when the yield from the process of the transformation of non-reducing glycerine into dihydroxyacetone, which reduces Fehling's solution in the cold, has reached 100 per cent. At this moment, that is to say after about 5 days, the mash is chemically worked up in the known manner.

(2) 5-10 parts of freshly prepared or dried draff are boiled with 100 parts of water, to the decoction so obtained are added 2.5 to 10 per cent. of glycerine, and the whole is then cooled and poured into dishes having a large surface. These fluids are inoculated with the above described fermentation bacteria and incubated at about 28° C. Samples taken indicate the process of the fermentation process and its termination.

I claim:

1. The process of converting glycerine into dihydroxyacetone by means of bacteria, which comprises cultivating strongly acidifying bacteria on such nutrient media as contain extractive-substances from vegetable materials to which the glycerine to be converted is added.

2. The process of converting glycerine into dihydroxyacetone by means of bacteria, which comprises cultivating root bacteria prepared from hay having undergone fermentation, on such nutrient media as contain extractive-substances from vegetable materials to which the glycerine to be converted is added.

3. The process of converting glycerine into dihydroxy-acetone by means of bacteria, which comprises cultivating strongly acidifying bacteria on such nutrient media as contain extractive substances from wood, to which the glycerine to be converted is added.

4. The process of converting glycerine into dihydroxy-acetone by means of bacteria, which comprises cultivating root bacteria prepared from hay having undergone fermentation, on such nutrient media as contain extractive substances from wood, to which the glycerine to be converted is added.

In testimony whereof, I affix my signature.

WILHELM LENZ.